US006976456B2

(12) United States Patent
Henig et al.

(10) Patent No.: US 6,976,456 B2
(45) Date of Patent: Dec. 20, 2005

(54) CONNECTING ROD

(75) Inventors: Yitzhak Isaac Henig, Ann Arbor, MI (US); Jeffrey Eliot Chottiner, Farmington Hills, MI (US); Jagadish Sorab, West Bloomfield, MI (US); Pravin Sashidharan, Inkster, MI (US); Satheesh Makkapati, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 10/604,104

(22) Filed: Jun. 26, 2003

(65) Prior Publication Data

US 2004/0261733 A1 Dec. 30, 2004

(51) Int. Cl.[7] .............................................. F02B 75/04
(52) U.S. Cl. ................... 123/48 B; 123/48 E
(58) Field of Search ........................... 123/48 R, 48 B, 123/78 E

(56) References Cited

U.S. PATENT DOCUMENTS

| | | | |
|---|---|---|---|
| 1,309,917 A | | 7/1919 | Tanaka |
| 4,830,517 A | * | 5/1989 | Naruoka et al. .......... 123/48 R |
| 4,834,031 A | | 5/1989 | Katoh et al. |
| 4,926,810 A | | 5/1990 | Diehl et al. |
| 6,336,441 B1 | | 1/2002 | Russell et al. |
| 6,394,047 B1 | | 5/2002 | Rao et al. |
| 6,412,453 B1 | | 7/2002 | Rao et al. |
| 6,499,446 B1 | | 12/2002 | Rao et al. |
| 6,510,821 B2 | | 1/2003 | Fujimoto et al. |
| 6,516,757 B2 | | 2/2003 | Aoyama et al. |

* cited by examiner

*Primary Examiner*—Noah P. Kamen
(74) *Attorney, Agent, or Firm*—Diana D. Brehob; Artz & Artz, P.C.

(57) ABSTRACT

An adjustable connecting rod system includes a reliable, rapidly responsive mechanism for varying effective connecting rod length to vary the compression ratio of the engine. The mechanism may employ the momentum of connecting rod components during operation of the engine to provide actuation force to vary connecting rod length. Connecting rod length is preferably controlled by manipulation of fluid-actuated locking members. In a preferred embodiment, hydraulic pressure is applied through the use of engine oil or other hydraulic fluids. The connecting rod preferably employs one or more movable compression members such as roller members or other mechanical components that may be shifted from one position to another with relatively little friction in order to vary the effective length of the connecting rod. The movable compression members may engage surfaces of both the crankpin bearing retainer and the connecting rod body, loaded in compression to transmit forces therebetween.

20 Claims, 11 Drawing Sheets

CONNECTING ROD

BACKGROUND OF INVENTION

1. Field of the Invention

The invention relates to connecting rods, and more particularly to a variable length connecting rod for varying compression ratio and associated methods and apparatus.

2. Background Art

Changing the compression ratio of an internal combustion engine by variation of connecting rod length has been the subject of a number of proposals and patents. See, e.g., U.S. Pat. No. 4,834,031. However, design of a commercially viable variable compression ratio (VCR) engine has proven to be an elusive goal, due largely to the difficulties associated with providing a suitable mechanism for changing the connecting rod length.

U.S. Pat. No. 4,834,031 discloses varying compression ratio by rotating an eccentric bearing on the pin that joins the connecting rod to the piston, which is referred to therein as the piston pin. The bearing has an eccentric bore into which the piston pin is fitted. A lock pin is employed to lock the eccentric bearing against rotation relative to the connecting rod for operation in high compression ratio mode. Oil pressure is employed to unlock the eccentric bearing by shifting the lock pin out of engagement with the eccentric bearing for operation in low compression ratio mode. Oil is provided for control purposes through passages in the crankshaft and the connecting rod.

In the mechanism of U.S. Pat. No. 4,834,031, there is a need to shift the lock pin rapidly and precisely within a narrow time interval. To achieve sufficiently rapid shifting, inertia and friction between the components must be overcome, typically by fluid pressure, but the magnitude of fluid pressure available for this purpose may be limited.

In the mechanism described in the above referenced '031 patent, shifting of the lock pin must occur within a very narrow window of time during which the eccentric bearing and connecting rod are aligned. Implementation of this mechanism in a commercially viable engine would be difficult in light of the need to overcome friction and inertia to accelerate the pin sufficiently rapidly to insert it into and withdraw it from the eccentric bearing within the available window of time. Friction associated with sliding the pin into and out of the eccentric bearing would be particularly problematic if the openings for the lock pin in the eccentric bearing and connecting rod were not precisely aligned at the critical point in time.

While the oil pressure applied to the lock pin may theoretically be raised to a high enough level to overcome the friction and inertia, in practice oil leakage may become prohibitive at high pressures in systems of this type where oil is transmitted between components that are moving relative to one another. Providing oil at a high enough pressure to overcome the friction and inertia in the mechanism described in the '031 patent would be particularly difficult due to the need to transmit the oil along the length of the connecting rod to reach the piston pin.

SUMMARY OF INVENTION

The invention relates to an adjustable connecting rod system wherein effective connecting rod length is changed by shifting connecting rod system components relative to one another (1) by employing low friction rolling contact between connecting rod system components, and/or (2) by timing the shifting so that momentum of the components effects shifting of one or more components, or at least assists in shifting one or more system components. This enables the process to be controlled using fluid pressures that are readily achievable at the components location without excessive leakage.

The preferred embodiment relates to a system for use in a VCR engine, or in another operating context with one or more pistons connected to a crankshaft by the adjustable connecting rod system. For each of the connecting rods the system provides a reliable, rapidly responsive mechanism for varying effective connecting rod length to vary the compression ratio of the engine.

The mechanism preferably employs the momentum of connecting rod system components during operation of the engine to provide actuation force to vary connecting rod length. Control is preferably provided by manipulation of fluid-actuated stop members as described below. In a preferred embodiment, hydraulic pressure is applied through the use of engine oil or other hydraulic control fluids.

The connecting rod system preferably comprises a crankpin bearing retainer that may be shifted relative to the connecting rod, and preferably employs one or more movable compression members such as roller members or other mechanical components on the crankpin bearing retainer that may be shifted from one position to another with relatively little friction in order to vary the effective length of the connecting rod. Positioning the movable members on the crankpin bearing retainer reduces the distance that a control fluid must travel to actuate them, as compared with prior proposals wherein changing compression ratio requires transmitting a control fluid along the length of the connecting rod.

In the preferred embodiment, each connecting rod includes upper and lower compression members, and each one has a contact surface that is generally cylindrical, part cylindrical, or otherwise shaped so as to be capable of rolling through at least a partial revolution. In other embodiments, the movable compression members may slide, pivot, or otherwise change position without rolling. The movable compression members preferably engage both the crankpin bearing retainer and the connecting rod body, with the upper and lower compression members being alternately loaded in compression between the bearing retainer and the connecting rod body to transmit forces therebetween.

In the preferred embodiment, each of the movable compression members is subject to periodic forces urging it alternately toward a first position and a second position while the engine is operating. Each movable compression member is preferably constrained by stop mechanisms that normally maintain the effective connecting rod length at a desired setting. Variation of connecting rod length is preferably effected by shifting the position of one or more stop mechanisms to enable the mechanical components to be shifted by inertial forces.

The stop mechanisms are preferably configured to permit one-way travel only while varying connecting rod length. Thus, connecting rod length may be changed from a first setting to a second setting rapidly and precisely, without any system components shifting back and forth between two settings. Damping may be provided to reduce or eliminate impact loads associated with the variation of connecting rod length. The mechanism preferably changes the effective length of all connecting rods in an engine within three revolutions of the engine.

In the preferred embodiment, each stop mechanism is movable between a lock position and a release position. Momentum associated with movement of the connecting rod during operation of the engine preferably causes the movable compression members to roll or otherwise move from a first position to a second position when the stop mechanism is in its release position. Each connecting rod preferably has a pair of stop mechanisms, one on each side of the crank bearing, with the stop mechanisms being operated simultaneously to enable compression members on both sides of the crank bearing to shift position simultaneously, or nearly simultaneously.

In the illustrated embodiment, each stop mechanism comprises a double acting lever system comprising a first stop member that retains the movable compression member in its first position at certain times, and a second stop member that retains the movable compression member in its second position at other times. The stop members may each be levers that pivot together in response to hydraulic actuation. Each stop member is preferably biased toward its locking position so that it may be deflected by the movable compression member from locking position to release position to permit the movable compression member's movement in one direction from one position to another, then may be returned to its locking position by the biasing force to lock the movable compression member in its new position.

Each stop mechanism in the illustrated embodiment comprises a pair of L-shaped levers that pivot independently on a common axis, and are biased toward their locking positions by one or more resilient members such as a single torsion spring urging them in opposite rotational directions, or by linearly acting springs acting separately on them. In these stop mechanisms, each L-shaped lever has a first leg that functions as a stop member and a second leg that is engaged by a hydraulic actuator. In other embodiments the L-shaped levers may be rigidly connected to one another to pivot as one.

The hydraulic actuator preferably comprises a double acting linearly movable element such as a spool or slider supported on a rod, track or other structure. The illustrated element comprises a spool that is movable in a channel in one dimensional movement between a centered position in which both stop members are locked, and first and second release positions at opposite ends of the channel. In each release position, one of the members is pivoted to its release position while the other remains in its locked position. In some embodiments, the control system may be capable of placing and maintaining the element in any of the three positions. In other embodiments, the control for the element may be binary, i.e., the control system may be capable of maintaining the element only in two release positions.

The invention may improve performance and efficiency of engines of various kinds, and vehicles or other apparatus powered by such engines. The invention may enable certain vehicles to meet important performance or efficiency standards, e.g., fuel efficiency standards, that they could not otherwise meet. The invention may be embodied in engines and motors that include connecting rods, including gasoline engines and diesel engines, and in any vehicle or other apparatus that employs such an engine, e.g., automobiles, motorcycles, snowmobiles, trucks, buses, aircraft, watercraft, generators, construction equipment or other machines. The invention may also be embodied in pumps or other apparatus in which variation of compression ratio may be useful.

DETAILED DESCRIPTION

The invention is preferably embodied in an adjustable connecting rod system, and in methods and apparatus using the system. The system described in detail below is intended to be suited for use in connection with an engine such as an internal combustion engine comprising one or more pistons connected to a crankshaft by the adjustable connecting rod system. The connecting rod includes a reliable, rapidly responsive mechanism for varying effective connecting rod length to vary the compression ratio of the engine. The mechanism employs the momentum of connecting rod components during operation of the engine to provide actuation force to vary connecting rod length.

Control is preferably provided by double acting fluid-actuated stop mechanisms as described below. Hydraulic pressure is applied through the use of engine oil or other hydraulic fluids.

Figure 7:
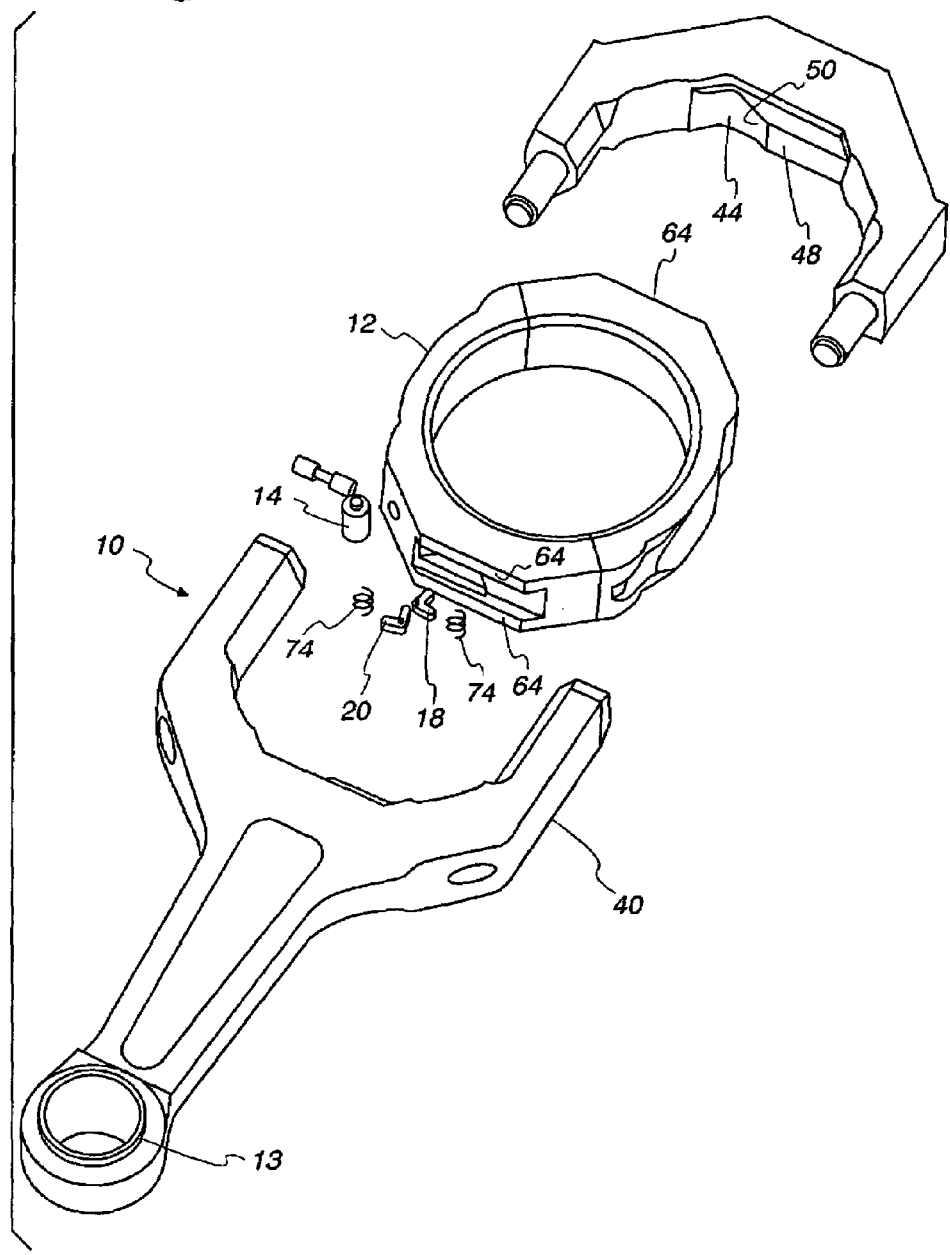
FIG. 7 is an exploded perspective view the mechanism of FIGS. 1–5.

FIG. 7 is an exploded perspective view illustrating an adjustable connecting rod system in accordance with the invention comprising a connecting rod 10 and a bearing retainer 12. The term adjustable as used herein refers to capability of the connecting rod to function at two or more different effective lengths. That is, the distance between the center of the crank bearing retainer 12 and the center of the wrist pin bearing retainer 13 is variable by shifting the position of the crankpin bearing retainer 12 relative to in connecting rod body 40. This is referred to herein as changing the connecting rod length, or sometimes is referred to as changing the effective length of the connecting rod, although it may be appreciated that the overall length of the connecting rod from one extremity to another does not change in the illustrated embodiment.

FIGS. 1–5 show the lower end of the connecting rod and the bearing retainer, and illustrate a sequence of steps during which the effective length of the connecting rod is decreased to decrease compression ratio. With reference to FIGS. 1–5, the bearing retainer orbits the crankshaft axis in a counter-clockwise direction.

The connecting rod preferably employs a pair of movable compression members such as hardened rollers 14 that may be shifted from one position to another with relatively little friction in order to vary the effective length of the connecting rod. In the illustrated embodiment, each of the movable compression members 14 has a generally cylindrical contact surface. In other embodiments, the contact surface may be part cylindrical, elliptical or otherwise curved so as to be capable of rolling through at least a partial revolution, to enable the movable compression member to move between its operating positions with relatively little friction or other resistance. The illustrated rollers engage the crank bearing retainer 12 and the connecting rod body, loaded in compression to transmit compressive force therebetween. Variation of connecting rod length is preferably effected by shifting the position of one or more stop mechanisms 26 and 28 to enable the compression members 14 and 16 to be shifted by their own momentum.

Figure 1:
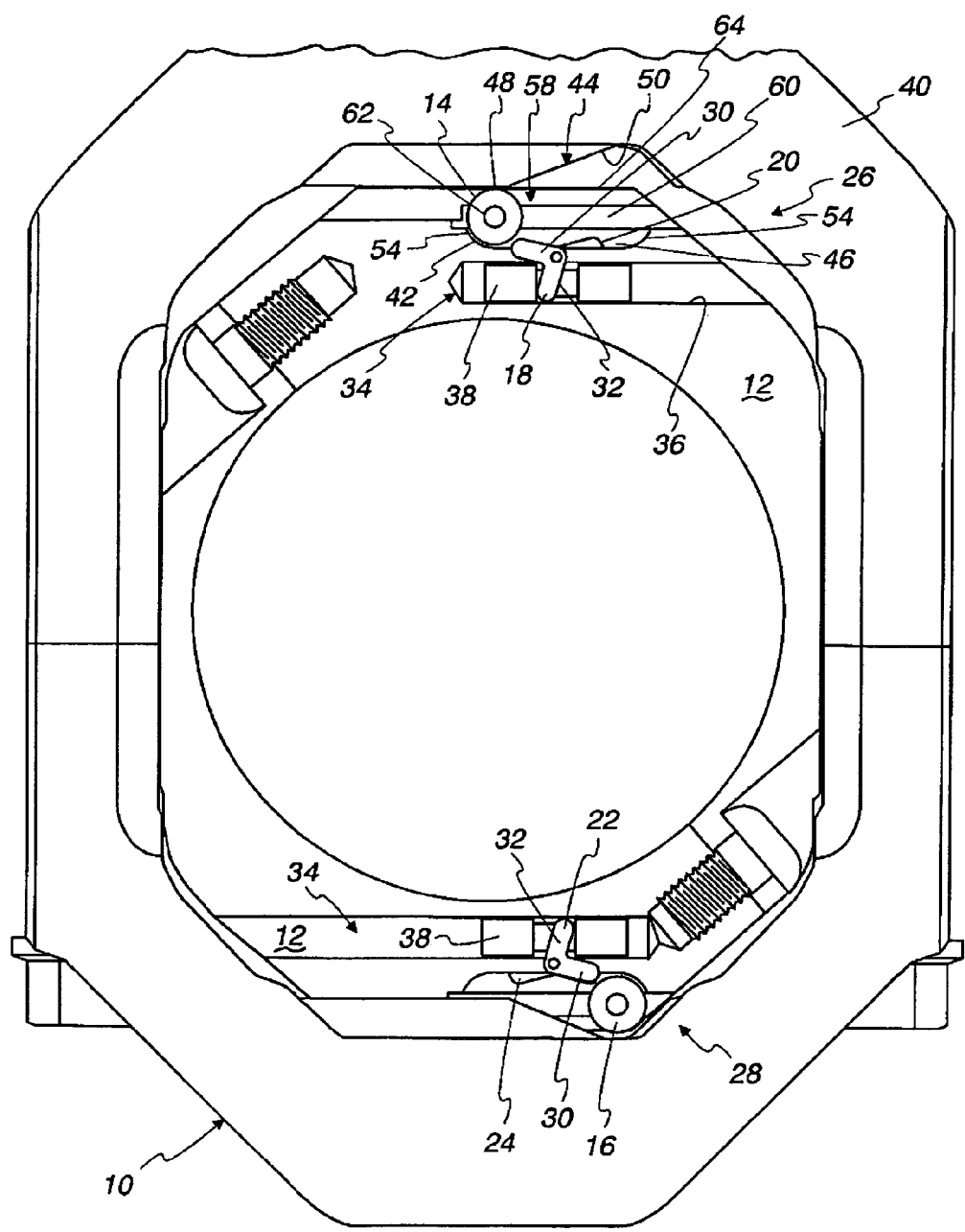
FIGS. 1–5 are schematic elevational views of a mechanism in accordance with an embodiment of the invention, showing a sequence of steps associated with decreasing the effective length of a connecting rod, i.e., decreasing the distance between the crank bearing and the upper end of the connecting rod, to decrease compression ratio.

In the illustrated embodiment, the upper compression member 14 is in a load bearing position when in its first position as illustrated in FIG. 1. In contrast, the lower compression member 16 is unloaded when in its first position as shown in FIG. 1. Thus, compression loads between the bottom of the bearing retainer 12 and the lower interior surfaces of the connecting rod body 40 are carried by surfaces on the respective bearing retainer and connecting rod body, rather than by a roller. The load bearing surfaces of the bearing retainer 12 for engaging the upper interior surfaces of the connecting rod body are shown at 64 in FIG. 6.

Each of the rollers is constrained for movement along a defined path between contoured surfaces 44 and 46 on the connecting rod 10 and bearing retainer 12 respectively. The surface 44 on the connecting rod body preferably has a horizontal portion 48 for engaging the roller when the roller is loaded in compression, and a second portion 50 that is sloped, curved, or otherwise contoured to provide increased spacing between the connecting rod body and the bearing retainer proceeding from left to right.

Figure 6:
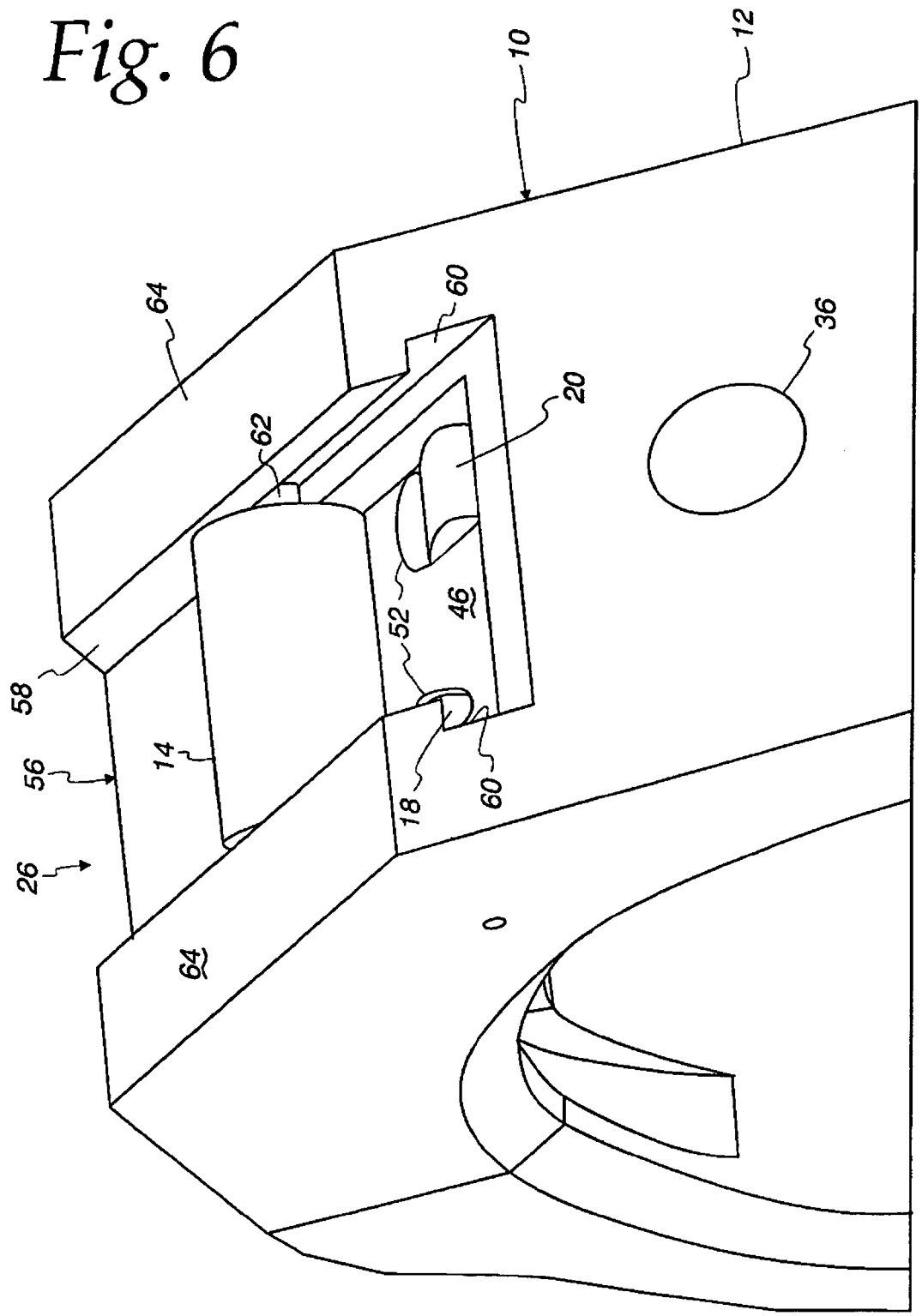
FIG. 6 is an enlarged schematic perspective view of a portion of the mechanism of FIGS. 1–5.

The contoured surface 46 on the bearing retainer 12 in the illustrated embodiment is generally horizontal with openings 52 for the stop members, and upwardly curved ends 54 to limit roller travel. By providing curved ends, impact forces associated with termination of roller travel are reduced. The surface 46 is preferably disposed at the bottom of the channel 56 which, as shown in FIG. 6, as sidewalls 58 with elongated grooves 60 therein to retain roller ends 62 which are reduced diameter.

Each of the rollers 14 and 16 is subject to periodic forces urging it alternately toward a first position and a second position while the engine is operating. FIG. 1 illustrates upper and lower rollers 14 and 16 on a connecting rod oriented for generally vertical reciprocation, wherein the travel of the rollers is generally horizontal. The connecting rod and associated engine components may, of course, be oriented differently, but will be described herein with reference to this Each stop mechanism 26, 28 comprises a pair of stop members and means for shifting the positions of the stop members. The illustrated stop mechanisms comprise two pair of levers 18, 20 and 22, 24. Each lever pivots between a locking position and a release position in response to hydraulic actuation. Each lever is preferably biased toward a locking position but remains movable when in locking position so that it may be deflected from locking position to release position by the roller to permit the roller's movement in one direction from one position to another, and the stop member then may be returned to its locking position by the biasing force to lock the roller in its new position. In other words, when in locking position, each lever permits one way travel of its associated roller into a position in which it is constrained against further movement.

In the illustrated embodiment, the upper stop mechanism 26 comprises a first L-shaped lever 18 that retains the upper roller in its first position at certain times, and a second L-shaped lever 20 that retains the roller in its second position at other times. The lower stop mechanism 28 similarly comprises a first L-shaped lever 22 that retains the lower roller 16 in its first position at certain times, and a second L-shaped lever 24 that retains the lower roller 16 in its second position at other times.

Figure 8:
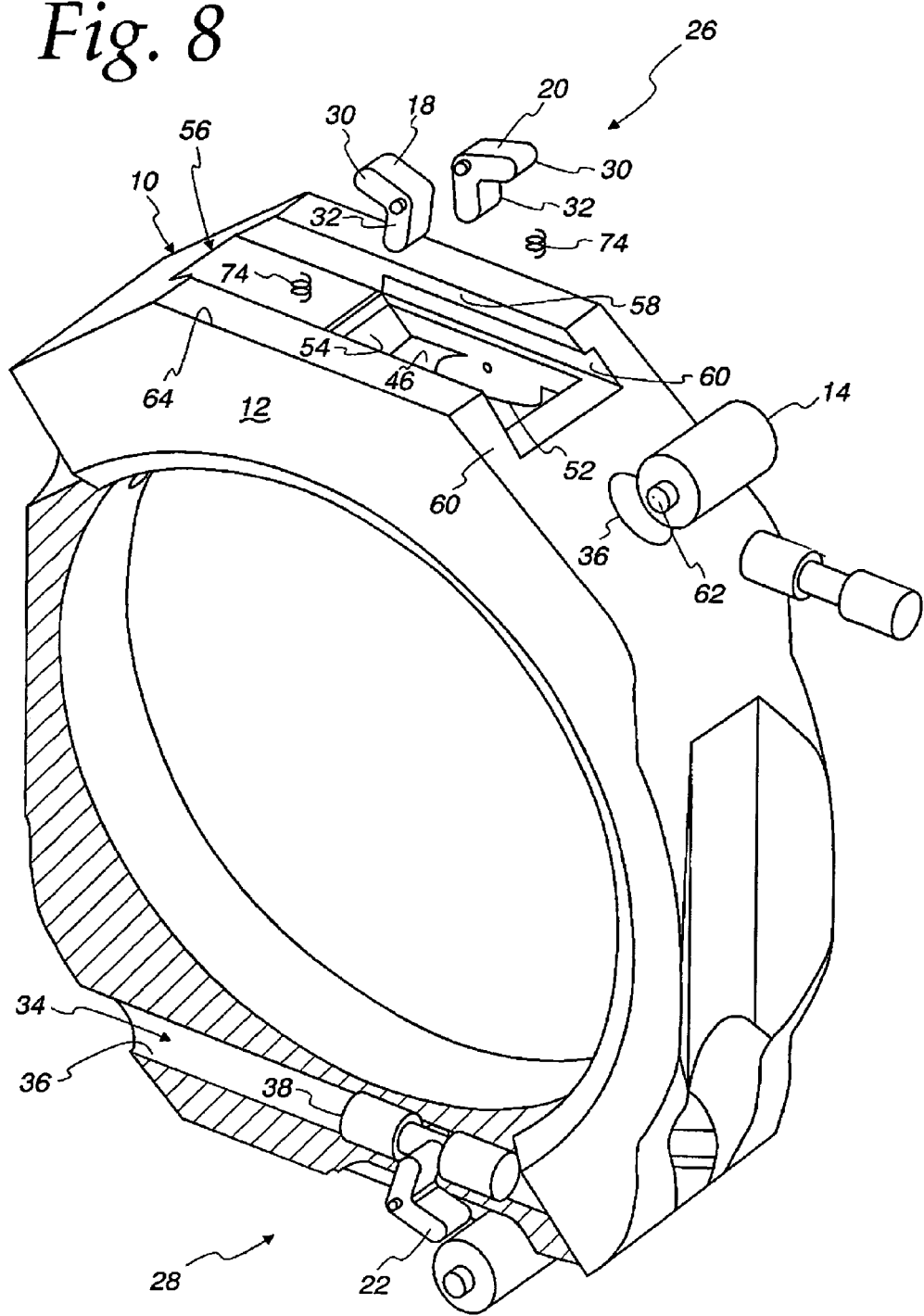
FIG. 8 is a partially exploded perspective view of the mechanism of FIGS. 1–5, with portions broken away.

Each illustrated pair of L-shaped levers pivot on a common axis, and are biased toward their locking positions by one or more resilient members such as a single torsion spring urging them in opposite rotational directions, or by torsional or linear springs 74 as shown in FIGS. 7 and 8, loaded in compression and acting separately on them. In these stop mechanisms, each L-shaped lever has a first leg 30 that functions as a stop member and a second leg 32 that is engaged by a hydraulic actuator 34. FIG. 8 illustrates coil springs that may be loaded in compression, interposed between each stop member and a surface of the bearing retainer to bias the stop member toward its locking position, i.e., away from the bearing retainer.

The hydraulic actuator 34 preferably comprises a double acting linearly movable element such as a spool 38 or slider supported within a cylindrical channel 36 that permits one dimensional movement between a centered position in which both stop members are locked, and first and second release positions in which one of the members is pivoted to its release position while the other remains in its locked position. In some embodiments, the spool may be biased by one or more springs, fluid pressure or other means toward its centered position so that it will be in stable equilibrium in centered position under normal conditions. In other embodiments, the spool is not biased toward the center position, but rather will normally be in one of the release positions, and will be in intermediate positions only when moving between the release positions.

Actuation force is preferably provided to the spool by hydraulic using engine oil or another fluid supplied to the cylinder containing the spool through internal channels in the crankshaft. The spool has a slot or a central region of reduced diameter for receiving one of the legs of each lever on each side so that the lever pivots when the spool is translated. The slot preferably has a longitudinal dimension greater than that of the legs received therein to permit the lever freedom to pivot in response to pressure from the roller without corresponding translation of the spool.

In FIG. 1, the connecting rod is shown in its longer configuration, with the upper and lower rollers locked in their first positions by the respective stop mechanisms 26 and 28. The sequence of steps to change the effective length of the connecting rod begins with shifting the stop mechanisms from their locking positions, illustrated in FIG. 1, to release positions, illustrated in FIG. 2.

Figure 3:
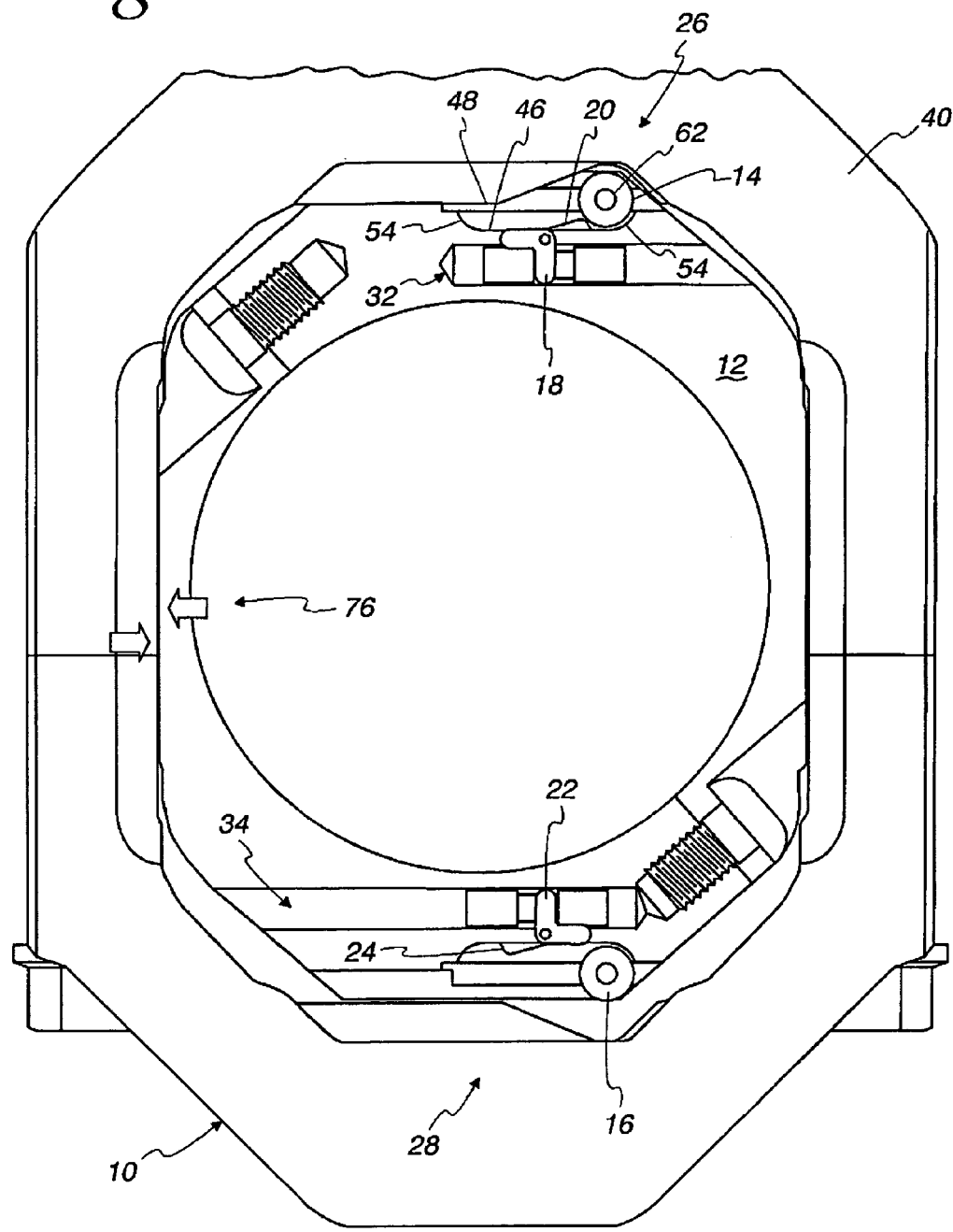

The upper roller 14 is then displaced horizontally toward the right and toward its second position relative to the connecting rod body 40 by inertia, i.e., its momentum, and continues its horizontal travel until it reaches its second position, shown in FIG. 3. The initiation of horizontal travel of the roller occurs as result of acceleration of the lower end of the connecting rod toward the left in FIG. 3 while the connecting rod is loaded in tension, thus unloading the roller so that friction resulting from compression loading does not prevent its movement. As noted above, the stop mechanisms are preferably configured to permit only one-way travel of the rollers between first and second positions. Thus, although the momentum of the rollers rapidly reverses direction, the roller moves from its first position to its second position rapidly and precisely in a single, one-directional movement shifting back and forth.

Figure 2:
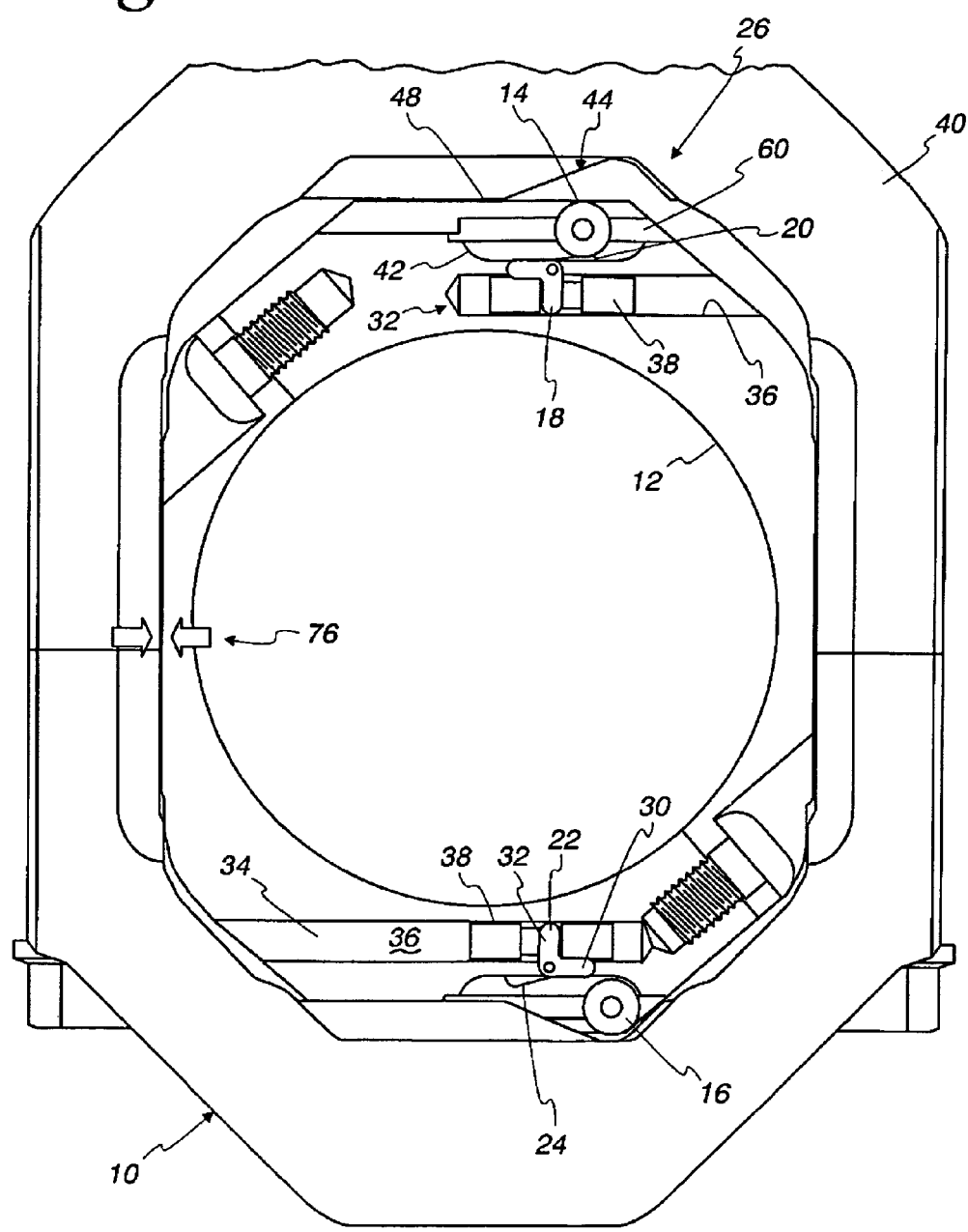
Figure 4:
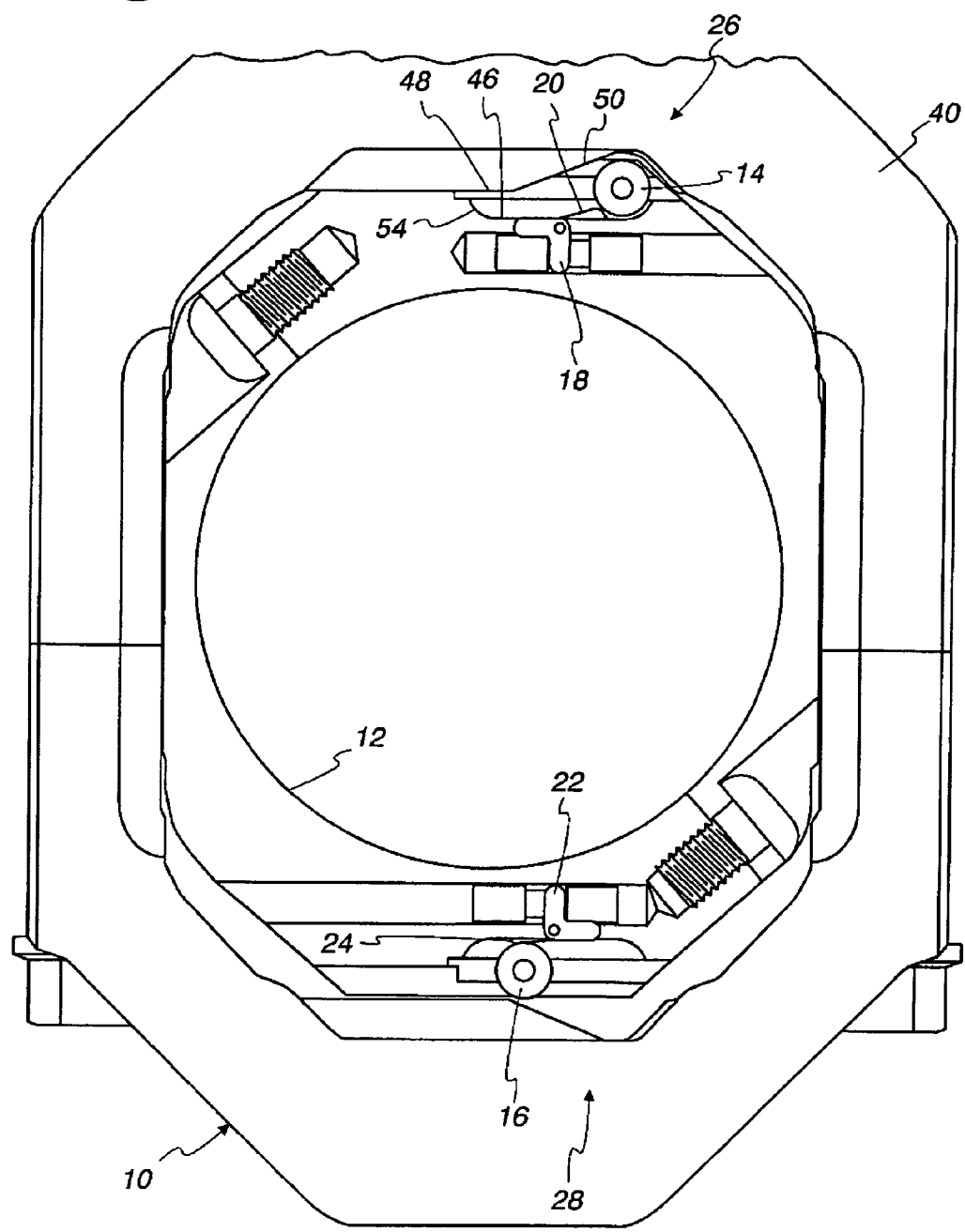
Figure 5:
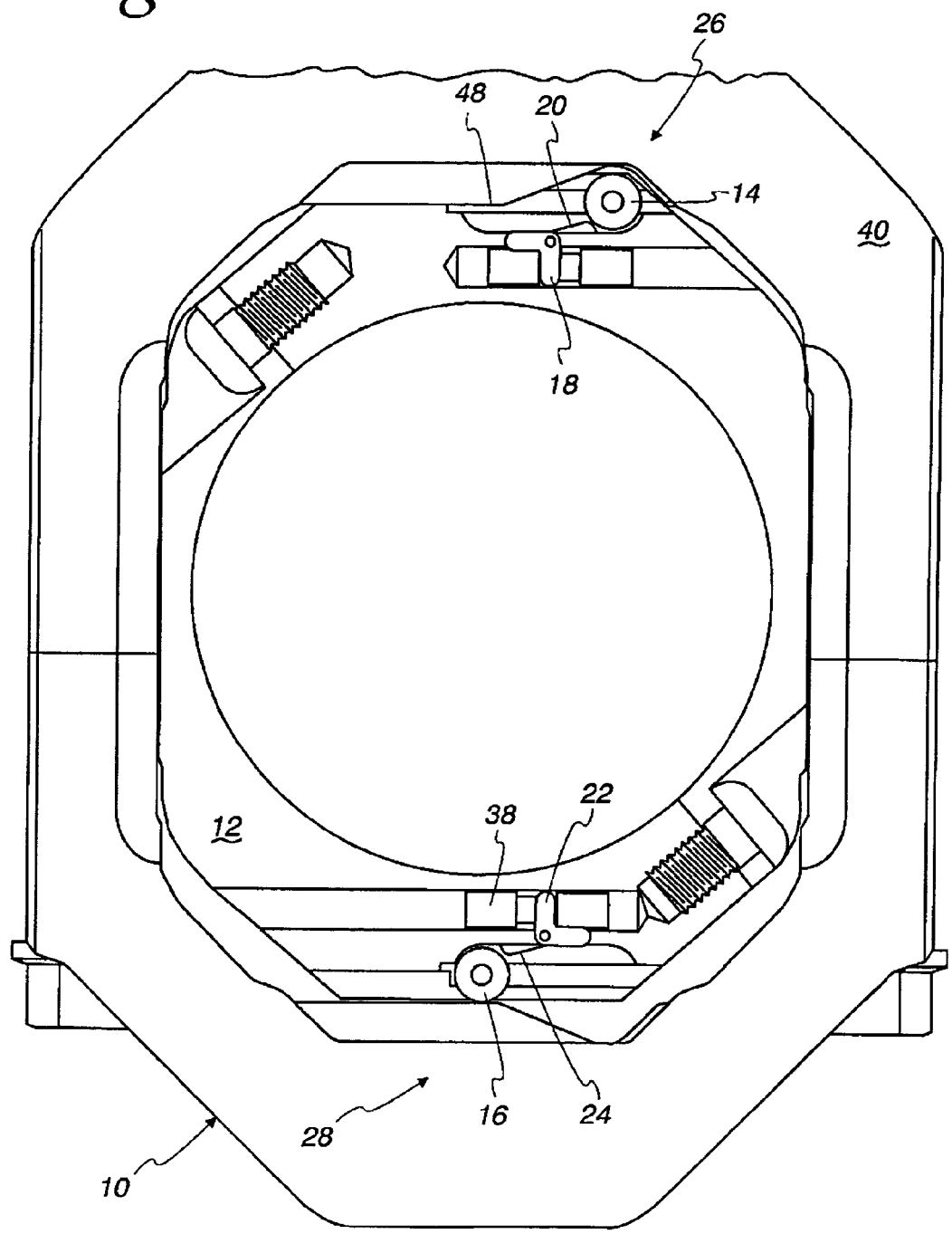

As the rollers 14 and 16 approach the positions illustrated in FIG. 3, the bearing retainer 12 shifts relative to the connecting rod body 40 as illustrated by arrows in FIGS. 2 and 3, in response to compression loading of the connecting. As shown in FIG. 4, the lower roller then travels to the left relative to the lower end of the connecting rod body in response to acceleration of the lower end of the connecting rod to the right. As the lower roller passes over the first leg or stop member 30 of lever 18, it displaces the stop member out of its way and reaches the end of the range of movement permitted by the slot in the bearing retainer in which it travels. The stop member 30 of lever 18 then returns to its locking position as shown in FIG. 5, preventing the bottom roller from returning to the right.

At this point, the connecting rod has been shifted to its shorter effective length and the stop mechanisms 26 and 28 lock the roller members in position so that the system is stable. The spools 38 may be maintained in position by hydraulic pressure or by other means. The engine will continue to operate in the lower compression ratio mode with the connecting rod length at its lower setting until the spools are again actuated to increase the effective connecting rod length and shift the system back to high compression ratio mode.

Figure 9:
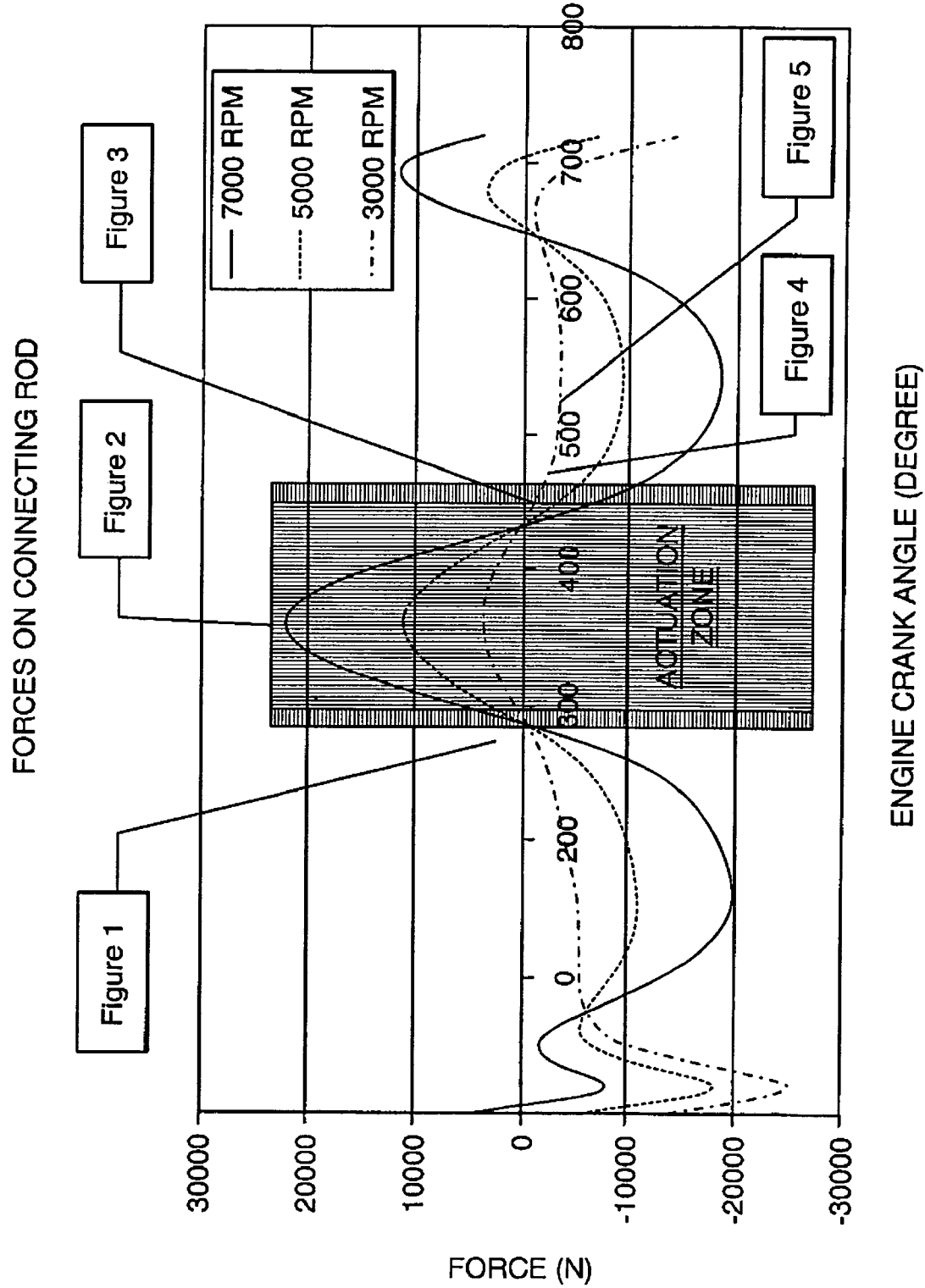
FIG. 9 is a graph illustrating the timing of a method in accordance with an embodiment of the invention.

FIG. 9 illustrates the timing of the sequence of steps discussed above, and shows connecting rod forces for a single cylinder and connecting rod as a function of engine crank angle through two revolutions of the crankshaft of a four cycle engine. Zero and 360 degrees represent engine crank angle at top dead center (TDC). Forces are shown at three rotational velocities, with tension on the connecting rod being positive and compression negative.

It may be noted that the compression ratio of the cylinder is the ratio of the volume in the cylinder above the piston when the piston is at bottom dead center (BDC), i.e., at 180 or 540 degrees in FIG. 9, to the volume in the cylinder above the piston when the piston is at TDC, i.e., at 0 degrees or 360 degrees in FIG. 9. In general, increasing compression ratio increases thermal efficiency and fuel economy. However, increasing compression ratio may result in undesirable consequences such as preignition or knocking under certain operating conditions, e.g., when the engine is operating under high loads.

The engine is equipped with a control system that receives information about relevant operating conditions and selects the appropriate compression ratio based on information received. An example of a suitable control system that may be adapted for use with the mechanism described herein is described and illustrated in the above-referenced co-pending U.S. patent application Ser. No. 10/105,749, filed Mar. 25, 2002.

In FIG. 9, forces are plotted for engine rotational velocities of 3,000, 5,000 and 7,000 RPM. The system in the preferred embodiment will shift compression ratio only at rotational velocities of 3,000 RPM or below.

Actuation of the spool to shift the stops from the locking positions shown in FIG. 1 to the release positions shown in FIG. 2 may take place at any time during the four cycle operation of the engine. However, initiation of left to right displacement of the upper roller 14 as shown in FIGS. 2–3 will not occur while the connecting rod is loaded in compression, due to the roller member being held in place by friction.

Thus, as shown in FIG. 9, initiation of horizontal displacement of the upper roller member will occur at a point where compression loads on the connecting rod approach zero, i.e., at an engine crank angle of between about 270–300. During this interval, the horizonatal component of the acceleration of the lower end of the crankshaft associated with its circular motion about the crankshaft axis is directed to the left of FIGS. 1–5. Accordingly, once the compression loading of the upper roller member is reduced sufficiently, the momentum of the upper roller member will cause it to begin horizontal displacement to the right relative to the surrounding structure of the lower end of the connecting rod body 40.

In FIG. 9, a region in which connecting rod length may be shortened is labeled as the actuation zone. At the beginning of the actuation zone, the connecting rod is not under compression loads, thus there are no compression loads on the upper roller. Shifting of the upper roller from left to right, shifting the bearing retainer 12 relative to the connecting rod body 40 to reduce effective length, and shifting of the lower roller 16 from right to left preferably occur later in the actuation zone, but the last two steps may occur outside the actuation zone as explained below.

Left to right displacement of the upper roll 14 will occur between the left edge of the actuation zone and 360 degrees, since the connecting rod body is accelerated right to left from 180 through 360 degrees.

From about 360 to about 540 degrees, the lower end of the connecting rod will be accelerated to the right. During this interval, the momentum of the lower roller will tend to shift the lower roller from right to left. Accordingly, once the bearing retainer has shifted upward relative to the connecting rod at about 440 to 450 degrees in response to initiation of compressive loading, the lower roller can shift from its left position to its right position. If this is not completed by 540 degrees, it may be completed in any subsequent interval during which the connecting rod is loaded in compression and is being accelerated from left to right. Thus, during operation as represented by FIG. 9, it may be completed within an interval of about 0 to 180 degrees or about 440 to 540 degrees during a subsequent rotation. However, it will preferably be completed by 540 degrees. In the preferred embodiment, the compression ratio of all cylinders of an engine will be shifted within three revolutions of actuation of the spools.

To change the effective length of the crankshaft back to its initial longer effective length, the sequence of steps is reversed. Left to right lower roller motion takes place while the connecting rod is loaded in compression and is being accelerated toward the left, e.g., between about 180 and 300 degrees during operation as represented in FIG. 9. The bearing retainer will then shift relative to the connecting rod while the connecting rod is loaded in tension, e.g., between about 300 and 440 degrees in FIG. 9. The change in upper roller position will occur while the connecting rod is being accelerated toward the right as well as being loaded in tension, i.e., between about 360 and about 440 degrees in FIG. 9.

Damping may be provided to reduce or eliminate impact loads associated with the variation of connecting rod length. Means for damping may include, e.g., hydraulic or pneumatic shock absorbers and the like connected to the bearing retainer and the connecting rod body.

Figure 10:
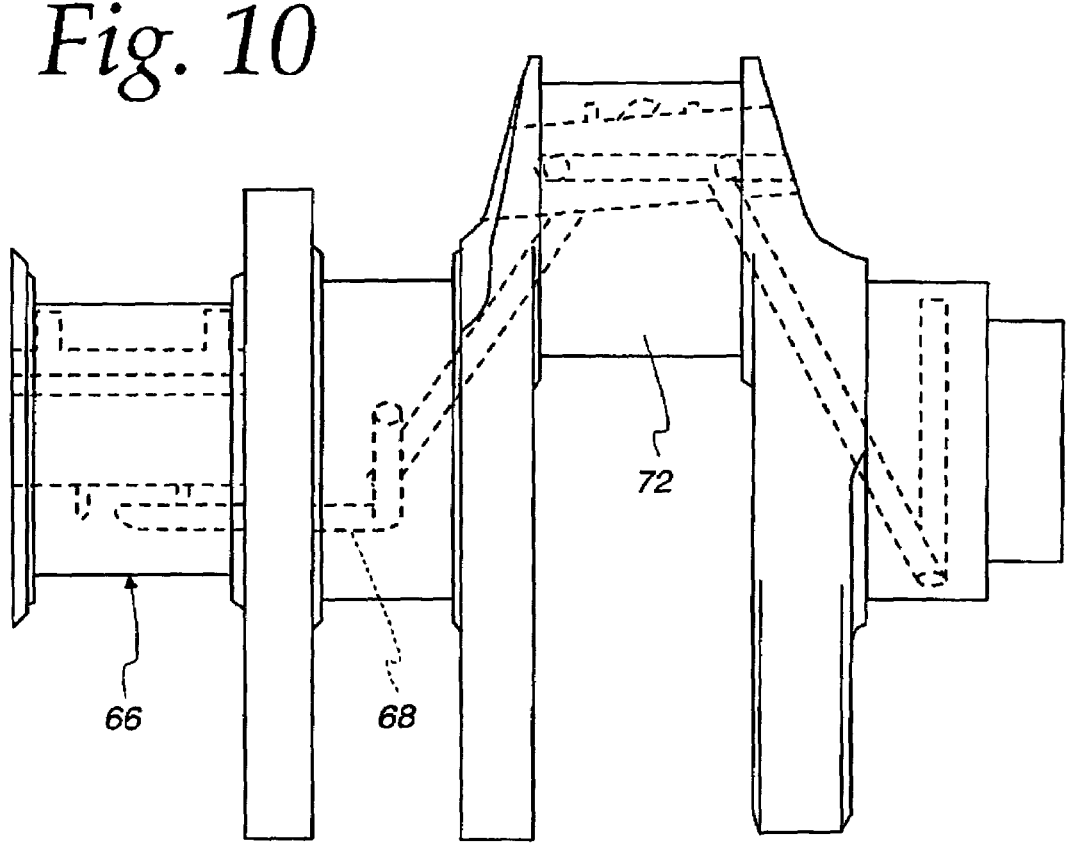
FIG. 10 is a side elevational view of a portion of a crankshaft for use in connection with an embodiment of the invention, with internal channels shown in broken lines.
Figure 11:
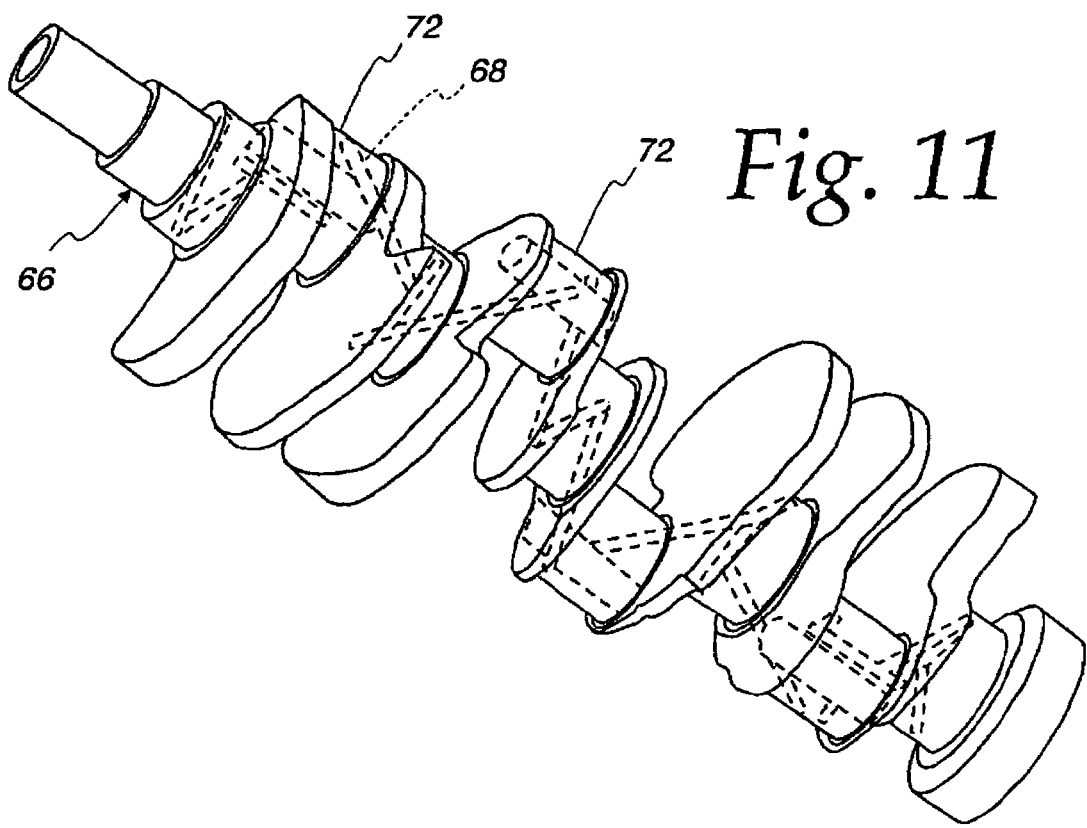
FIG. 11 is a perspective view of a crankshaft for use in connection with an embodiment of the invention, with internal channels shown in broken lines.

FIG. 10 illustrates a portion of a crankshaft 66 for use with the connecting rod 10 described herein as part of the system for varying connecting rod length. A view of the entire crankshaft 66 is illustrated in FIG. 11.

The crankshaft includes internal conduits or channels 68 for carrying hydraulic fluid such as oil to operate the system.

As noted above, the hydraulic fluid may be engine oil which functions as a lubricant at various points in engine, in addition to functioning as a control fluid or operating the system. The hydraulic fluid may be transmitted to the channel 70 in which the spool is located in bearing retainer 12 through the associated crankpin 72.

Figure 12:
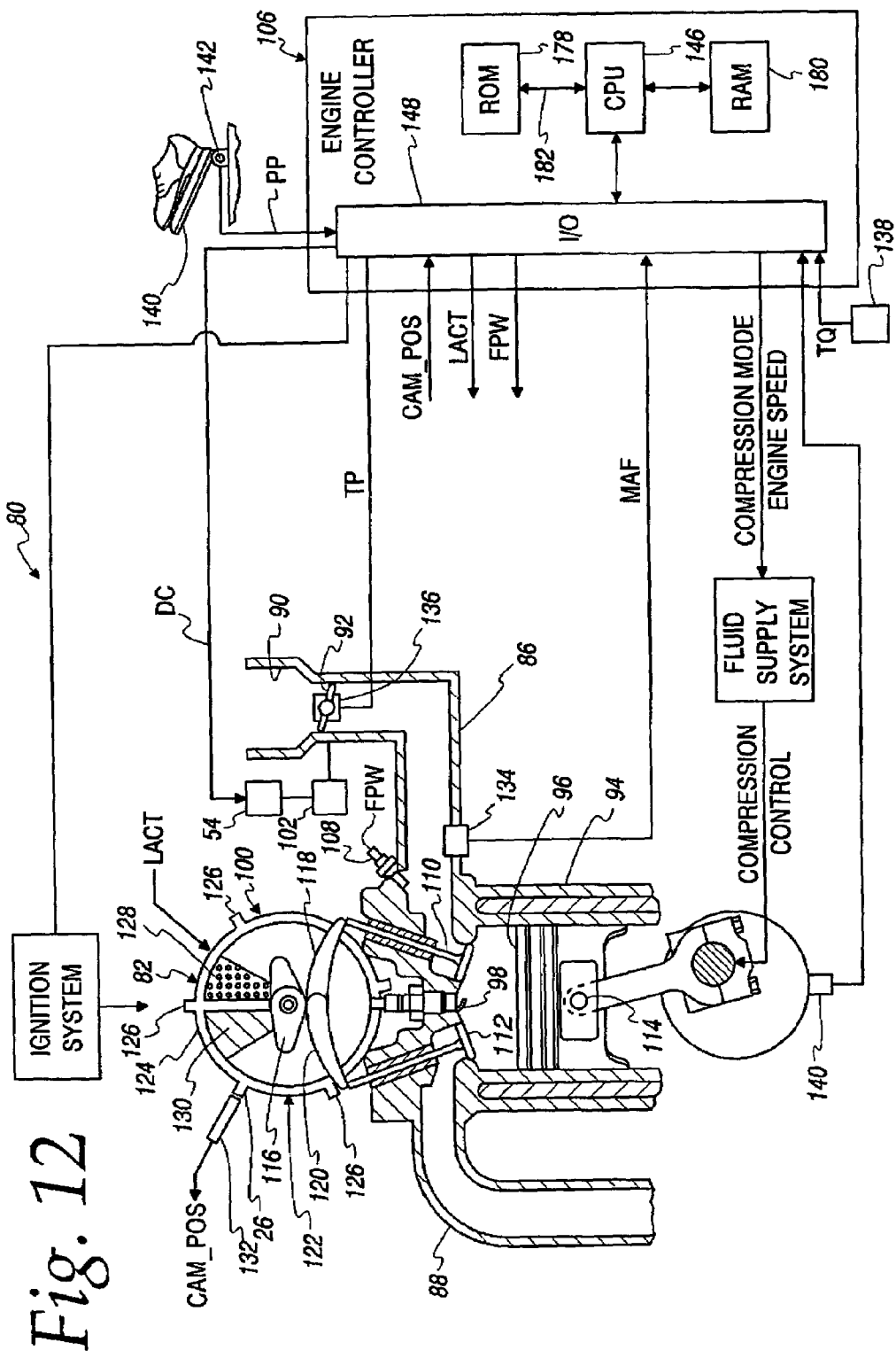
FIG. 12 is a diagram illustrating a control system in accordance with an embodiment of the invention.

FIG. 12 illustrates a vehicle 80 embodying the invention. Vehicle 80 includes an engine 82 and an engine control system 84. As illustrated, engine control system 84 is in electrical and hydraulic communication with engine 82.

Engine 82, for example, may comprise a gasoline, four-stroke, port fuel injection, four cylinder internal combustion engine. Alternatively, engine 82 may be another type of internal combustion engine, such as a direct fuel injection engine or a diesel engine. Further, the number of of engine 82 can be greater than or less than four cylinders depending on the desired vehicle performance.

Engine 82 includes an intake manifold 86, an exhaust manifold 88, a throttle body 90, a throttle plate 92, one or more cylinders 94, one or more pistons 96, one or more spark plugs 98, connecting rods 10, and VCT mechanism 100. Intake manifold 86 communicates with throttle body 90 via throttle plate 92. Throttle plate 92 is controlled by electric motor 102 which receives a signal from ETC driver 104. ETC driver 104 receives a control signal (DC) from a controller 106. Intake manifold 86 includes a fuel injector 108 coupled thereto for delivering fuel in proportion to the pulse width of signals (FPW) from controller 106. Fuel is delivered to fuel injector 108 by a conventional fuel system (not shown) including a fuel tank and a fuel pump.

Each cylinder 94 communicates with intake manifold 86 and exhaust manifold 88 via respective intake and exhaust valves 110, 112. Each cylinder includes a combustion chamber having a reciprocating piston 96 operably disposed therein. Piston 96 is connected to connecting rod 10 via a wrist pin 114. Connecting rod 10 is further coupled to crankshaft 66 via a crankpin 72. Ignition of air-fuel mixtures within cylinder 94 is initiated by respective spark plugs 40 which delivers ignition spark responsive to signals from distributorless ignition system 70.

As illustrated, each connecting rod is in fluid communication with fluid supply system 72. Although each connecting rod system is described herein as providing first and second or high and low compression ratios, each connecting rod assembly may be configured to provide one or more intermediate compression ratios for engine 82. The term "high compression ratio" means any compression ratio that is greater than any second compression ratio termed a "low compression ratio."

Variable cam timing (VCT) mechanism 100 is provided to vary the actuation time of intake and exhaust valves 110, 112 for each cylinder. VCT mechanism 50 cooperates with a camshaft 116, which is shown communicating with rocker arms 118, 120 for variably actuating valves 110 and 112. Camshaft 116 is directly coupled to housing 122. Housing 122 forms a toothed cam wheel 124 having teeth 126 thereon. Housing 122 is hydraulically coupled to an inner shaft (not shown), which is in turn directly linked to camshaft 116 via a timing chain (not shown). Therefore, housing 122 and camshaft 116 rotate at a speed substantially equivalent to that of the inner camshaft. The inner camshaft rotates at a constant speed ratio to crankshaft 66. However, by manipulation of the hydraulic coupling described later herein, the relative position of camshaft 116 to crankshaft 66 can be varied by hydraulic pressure in advance chamber 128 and retard chamber 130. By allowing high-pressure hydraulic fluid to enter advance chamber 128, the relative relationship between camshaft 116 and crankshaft 66 is advanced. Thus, intake valve 110 and exhaust valve 112 open and close at a time earlier than normal relative to crankshaft 66. Similarly, by allowing high-pressure hydraulic fluid to enter retard chamber 130, the relative relationship between camshaft 116 and crankshaft 66 is retarded. Thus, intake valve 110 and exhaust valve 112 open and close at a time later than normal relative to crankshaft 66.

Teeth 126 of cam wheel 124 are coupled to housing 122 and camshaft 116 and allow for measurement of relative position of camshaft 116 via cam timing sensor 132 which provides signal CAM_POS to controller 106. As illustrated, the teeth may be evenly spaced around the perimeter of cam wheel 124. Controller 106 sends control signal LACT to a conventional solenoid spool valve (not shown) to control the flow of hydraulic fluid either into advance chamber 128, retard chamber 130, or neither chamber.

The relative position of camshaft 116 is measured in general terms, using the time, or rotation angle between the rising edge of a PIP signal and receiving a signal from one of the teeth 126. A detailed description of the method for determining relative position of the camshaft 116 is described in commonly assigned U.S. Pat. No. 5,245,968 which is incorporated by reference herein in its entirety.

The engine control system is provided to control operation of engine 82 and in particular to effect a change in the compression ratio of engine 82. The engine control system preferably includes fluid supply system 72, a distributorless ignition system, electric motor 102 for controlling throttle plate 92, an ETC driver 104, connecting rod position sensors, an accumulator pressure sensor, a mass air flow sensor 134, a throttle position sensor 136, a torque sensor 138, an engine speed sensor 140, an accelerator pedal 144, a pedal position sensor 142, and the above mentioned controller 106. The engine control system controls fluid supply system 72 and the connecting rod assembly to effect a change in the compression ratio of engine 82.

Fluid supply system 72 controls the application of hydraulic fluid pressure to each connecting rod 10 to vary compression ratio in each cylinder. The fluid supply system 72 includes a pump to pump fluid, such as engine oil, from a reservoir to a fluid accumulator. The accumulator maintains the fluid at a suitable pressure for use as a control fluid. The pressure is preferably less than 1000 psi, and more particularly is preferably between 0 and 600 psi. In some embodiments, the pressure may be between 200 and 400 psi, e.g., about 300 psi. In other embodiments, the pressure may be higher or lower.

An oil cooler may be provided to cool engine oil pumped therethrough using engine coolant and thereby increase the oil viscosity. The increased oil viscosity can reduce an amount of oil leakage in fluid supply system 72 if oil leakage occurs.

In some embodiments, connecting rod position sensors generate signals that can be utilized to determine whether the connecting rods are in an extended position to obtain a high compression ratio, or (ii) in an unextended position to obtain a low compression ratio. In other embodiments, pressure sensors may directly measure the pressure in each cylinder 94 to determine whether the cylinders are at a high or low compression ratio.

Torque sensor 138 generates a signal (TQ) that may indicate one of following torque values: (i) an engine crankshaft torque, (ii) a transmission torque, such as for example, a torque converter torque or a transmission output shaft torque, or (iii) an axle torque.

Engine speed sensor 140 may comprise a hall-effect sensor that generates a signal indicating an engine speed. Sensor 140 may be coupled to crankshaft 66 and transmits the signal to the controller 106.

Accelerator pedal 144 is shown with a driver's foot thereon. Pedal position sensor 142 generates a signal indicating accelerator pedal position (PP) that is transmitted to controller 106.

The engine controller 106 includes a central processing unit (CPU) 146, input/output ports 148, read-only memory (ROM) 178 or any suitable electronic storage medium containing processor-executable and calibration values, random-access memory (RAM) 180, and a data bus 182 of any suitable configuration. The engine controller 106 receives signals from a variety of sensors, such as the sensors discussed above, and controls operation of the fluid supply system 72, fuel injectors 108, throttle plate 92, and spark plugs 98 to change compression ratio at appropriate times to optimize engine performance, and to vary other engine parameters as well.

When engine controller 106 determines that it is desirable to change the compression ratio of the engine, based on one or more operating parameters, the engine controller 56 may control operation of fluid supply system 72 so as to supply pressurized oil to connecting rod 10.

For example, if engine controller 56 determines that it is desirable to change from high compression ratio mode to low compression ratio mode, engine controller 56 may open a valve of fluid supply system 72 for a predetermined amount of time, such as 100 to 300 milliseconds, shift the position of the spool 38 of each connecting rod 10.

From the foregoing, it should be appreciated that the invention provides a new and useful improvement in connecting rods and in methods and apparatus that employ connecting rods. The invention is not limited to the embodiments described above, or to any particular embodiments. The invention may be embodied in engines for use in powering automobiles and motor vehicles, as well as watercraft, aircraft, generators, and other apparatus. Furthermore, the invention may be employed in pumps or other applications other than engines.

While the invention has been described with reference to an embodiment employing a single upper roller and single lower roller associated with each connecting rod, in other embodiments, two or more upper and/or lower rollers may be provided for each connecting rod. In still other embodiment, as mentioned above, mechanical elements other than rollers may be employed. Such elements may include, but are not limited to, sliders, pinions, dogs, levers, or the like. Also, while the embodiment described above relies on momentum of compression members to shift their positions, in other embodiments, hydraulic actuation may be relied upon instead.

The invention is further described and pointed out in the following claims.

What is claimed:

1. A connecting rod assembly for varying a compression ratio of an engine, the engine having a crankshaft and a piston, the connecting rod comprising:
   a body and a roller member transmitting force between the piston and the crankshaft, said roller member being movable in low friction rolling contact relative to said body between a first connecting rod position corresponding to a first compression ratio and a second connecting rod position corresponding to a second compression ratio.

2. A connecting rod assembly in accordance with claim 1 wherein said roller member is moved from said first position to said second position by its own momentum during operation of said engine.

3. A method for varying the compression ratio of an engine, the engine having a connecting rod including a body and a roller member transmitting force between a piston and a crankshaft, the roller member being movable relative to the body between a first position corresponding to a first compression ratio and a second position corresponding to a second compression ratio, the method comprising:
   releasing a locking mechanism to allow momentum associated with said roller member to move the roller member from the first position to the second position to change the compression ratio from the first compression ratio to the second compression ratio.

4. Apparatus comprising an engine having at least one piston, one crankshaft and a connecting rod assembly capable of transmitting power from the piston to the crankshaft, said connecting rod comprising a body and at least one roller member transmitting force between said piston and said crankshaft, said roller member being movable relative to said body between a first connecting rod position corresponding to a first compression ratio and a second connecting rod position corresponding to a second compression ratio, with said apparatus further comprising a stop mechanism for controlling movement of said roller member, with said stop mechanism being movable between a locked position and a released position, and wherein momentum associated with movement of said connecting rod during operation of said engine causes said roller member to move from its first position to its second position when said stop mechanism is in its released position.

5. Apparatus in accordance with claim 4 further comprising a crankpin bearing retainer transmitting loads between said connecting rod body and said crankshaft, and wherein said roller engages said bearing retainer and said connecting rod body.

6. A method of varying the effective length of a connecting rod in an engine by varying the position of the connecting rod with respect to a crankshaft, with said engine having at least one compression member on a movable engine component, said compression member being movable relative to said movable engine component between a first connecting rod position corresponding to a first compression ratio and a second connecting rod position corresponding to a second compression ratio, said movable engine component being in periodic motion while said engine is operating, a movable stop for said at least one compression member to prevent said compression member from moving relative to said engine component between their first and second positions except at selected times, said movable stop being movable between a locking position in which it prevents movement of its associated compression member between first and second position, and a release position in which it permits movement of its associated compression member between first and second position, said method comprising:
   maintaining said at least one compression member in its first position during operation of the engine with a first compression ratio; and
   shifting said at least one compression member to its second position to enable operation of the engine with a second compression ratio by moving said movable stop to its release position so that the momentum associated with said at least one compression member results in its displacement to said second position.

7. A method of varying the effective length of a connecting rod in an internal combustion engine comprising a first compression member movable between a first position corresponding to a first compression ratio and a second position corresponding to a second compression ratio; a second compression member movable between a first position corresponding to a first compression ratio and a second position corresponding to a second compression ratio; each of said compression members being subject to periodic forces urging it alternately toward its first position and its second position while said engine is operating; a first pair of movable stops for said compression members to prevent said compression members from moving from their first positions to their second positions except at selected times, each of said first pair of movable stops being movable between a locking position in which it prevents movement of its associated movable compression member from its first position to its second position, and a release position in which it permits movement of its associated movable member from its first position to its second position; said method comprising:

maintaining said compression members in their first positions during operation of the engine with a first compression ratio; and permitting said compression members to shift to their second positions to enable operation of the engine with a second compression ratio.

8. A method in accordance with claim 7 wherein said compression members are rollers, and wherein permitting said compression members to shift to their second positions to enable operation of the engine with a second compression ratio comprises permitting said compression members to roll into their second positions.

9. A method in accordance with claim 8 wherein said compression members have generally cylindrical contact surfaces.

10. A method in accordance with claim 9 wherein permitting said compression members to shift to their second positions comprises shifting at least one of said movable stops from its locking position to its release position through the use of a movable spool having a slot to enable application of pressure to said at least one of said movable stops in either of two directions while permitting limited freedom of movement to said stop.

11. A method in accordance with claim 10 further comprising biasing each of said first pair of movable stops toward its locking position while (a) permitting each of said first pair of movable stops to move from said locking position to said release position in response to pressure from one of said compression members moving from first to second position and (b) preventing each of said first pair of movable stops from moving from said release position to said locking position in response to pressure from one of said compression members moving from second position toward said first position.

12. A method in accordance with claim 7 wherein said permitting results in increasing the effective length of the connecting rod while said connecting rod is loaded in tension during an intake stroke.

13. A method in accordance with claim 7 wherein said permitting results in decreasing the effective length of the connecting rod while said connecting rod is loaded in compression.

14. A method in accordance with claim 7 wherein said permitting results at different times in increasing the effective length of the connecting rod while said connecting rod is loaded in tension, and decreasing the effective length of the connecting rod while said connecting rod is loaded in compression.

15. A method in accordance with claim 7 wherein the effective length of said connecting rod is shortened while said connecting rod is loaded in compression during an exhaust stroke.

16. A method in accordance with claim 7 wherein the effective length of said connecting rod is shortened while said connecting rod is loaded in compression during a compression stroke.

17. A method in accordance with claim 7 further comprising permitting said compression members to shift back to their first positions to re-enable operation of the engine with said first compression ratio.

18. A method in accordance with claim 17 further comprising operating a second pair of movable stops to prevent said compression members from moving from their second positions to their first positions except at selected times, each of said second pair of movable stops being movable between a locking position in which it prevents movement of its associated movable compression member from its second position to its first position, and a release position in which it permits movement of its associated movable member from its second position to its first position.

19. A method in accordance with claim 18 wherein said movable stops comprise double acting levers.

20. A connecting rod assembly for varying a compression ratio of an internal combustion engine, the engine having a crankshaft and a piston, the connecting rod assembly comprising:

a first portion adapted to be connected to the piston;

a second portion adapted to be connected to a crankshaft for varying the position of said connecting rod with respect to said crankshaft, said first portion being adapted to move axially with respect to said second portion; and a roller member disposed between said first and second portions, said roller member being movable between said first and second portions from a first connecting rod position corresponding to a first compression ratio to a second position connecting rod corresponding to a second compression ratio.

* * * * *